D. A. HARRISON.
SOLAR HEATER.
APPLICATION FILED JULY 24, 1915.
1,258,405.
Patented Mar. 5, 1918.
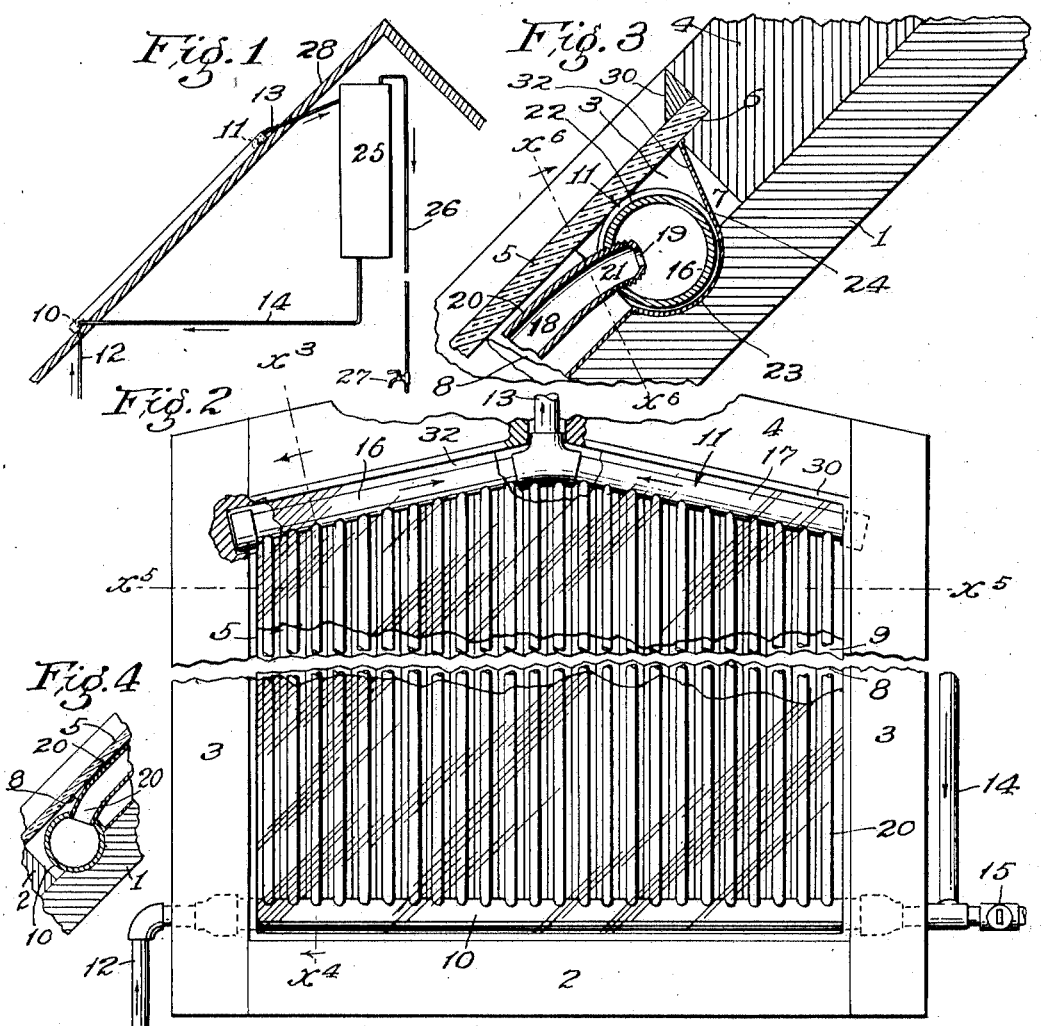
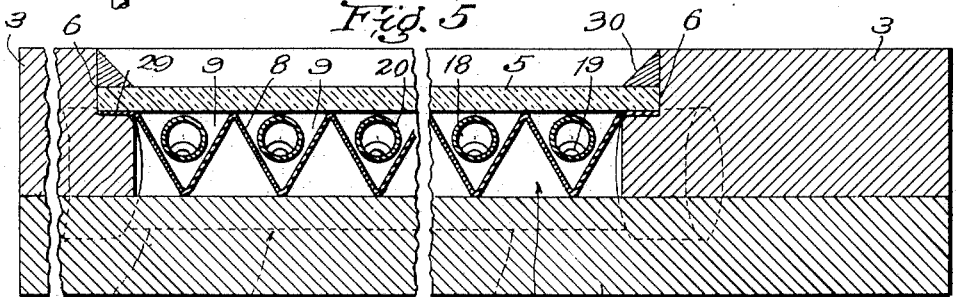
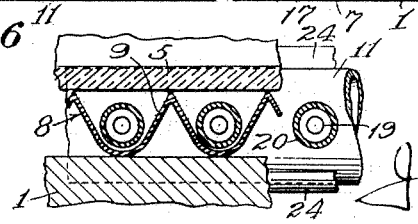
Witness
C. C. Holly
Inventor
David A. Harrison
by James R. Townsend
his atty.

UNITED STATES PATENT OFFICE.

DAVID A. HARRISON, OF LOS ANGELES, CALIFORNIA.

SOLAR HEATER.

1,258,405.

Specification of Letters Patent.

Patented Mar. 5, 1918.

Application filed July 24, 1915. Serial No. 41,789.

*To all whom it may concern:*

Be it known that I, DAVID A. HARRISON, a citizen of the United States, residing at Los Angeles, in the county of Los Angeles and State of California, have invented a new and useful Solar Heater, of which the following is a specification.

This invention relates more particularly to a heater for heating water, by the rays of the sun, for domestic use; but is also applicable for heating rooms or apartments in buildings through the medium of air or other fluid heated by caloric rays from the sun or from sources of heat where waste would otherwise occur, as from furnace rooms and the like.

Objects of the invention are to provide at low cost a highly efficient heater adapted to apply caloric rays to a heat-conducting medium to heat the same and to conduct said medium away from the heater for use as desired.

An object of the invention is to make provision for rapidly heating a supply of water by the sun's rays.

Another object is to provide for removing sedimentary deposits from the interior of the heater.

An object of the invention is to provide a cheap and simple form of construction whereby the heater is at one and the same time cheapened and increased in efficiency. This object is attained by providing a corrugated reflecting sheet of metal, the corrugations of which are adapted to form grooves in which thin tubes may be mounted so as to be subject to the caloric rays; insulating said sheet and isolating the tube-containing grooves so that heat rays reaching the grooves of the corrugated sheet will be directed to heat the water in the thin tubes.

The accompanying drawing illustrates the invention as applied in a solar water heater installed on the roof of a building.

Figure 1 is an elevation of a diagrammatic character showing the invention installed on the roof of a house and connected with a storage reservoir located in the house and provided with circulating and service pipes.

Fig. 2 is a front elevation of the heater shown in Fig. 1 on a somewhat larger scale.

Fig. 3 is a full size fragmental sectional elevation on line $x^3$, Fig. 2.

Fig. 4 is a sectional detail on line indicated at $x^4$, Fig. 2.

Fig. 5 is a full size fragmental section on line $x^5$, Fig. 2 showing one form of reflector.

Fig. 6 is a fragmental sectional detail on line indicated at $x^6$, Fig. 3 showing another form of reflector.

A heat receiving and insulating frame is shown comprising a heat insulating back 1 and surrounding walls 2, 3 and 4 at the ends and sides of said backing and a transparent panel 5 mounted in said walls that are recessed at 6 to receive the same, and forming therewith a chamber 7 into which heat rays may be directed through the transparent side or panel 5 that may be a sheet of glass or other material transparent to caloric rays. Inside said chamber there is provided a grooved reflector 8 having parallel longitudinal grooves 9 formed therein; said reflector being preferably constructed of a bright crimped or corrugated sheet of copper or other suitable reflecting material having a burnished or bright reflecting face presented toward the transparent panel 5.

At the ends of the parallel grooves in said reflector, headers 10, 11 are provided; said headers being of comparatively large diameter and having connections as at 12, 13 and 14 for receiving and discharging fluid and for allowing a circulation of water in case the fluid supplied is water.

A blow-out cock 15 is also provided at the end of the bottom or inlet header 10.

The top or discharging header 11 is constructed with two upwardly slanting limbs 16, 17 which are arranged obliquely to the thin tubes 20 leading upward away from the receiving header 10 to the discharge connection 13 so that the fluid flowing into the discharging header will pass freely to the outlet connection 13 with minimized friction at the change of direction.

One end of each of the tubes is contracted for the purpose of affording a comparatively large chamber at 18 within the tubes between the headers as compared with an orifice as at 19 through which the fluid has to pass in order that it may flow through the tube.

The purpose of the reduced orifice is to prevent short-circuiting of fluid when a discharge through 13 occurs.

In practical construction the tubes 20 will be made of thin copper tubing and the diameter of said tubes will preferably be about one quarter of an inch and that of the orifices 19 about one eighth of an inch, said tubes being about six feet long and there being about 24 such tubes, more or less, for a water heater adapted to supply hot water for ordinary family use.

The contracted orifice may be at either or both ends of the tube but it is preferred that the upper ends of the tube be provided with contracted orifices as shown in Fig. 3 and the lower ends of the tubes be fully open as shown in Fig. 4 so that in case water to be heated therein contains sedimentary material, the same may settle down and pass freely down through the lower ends of the tubes into the lower header 10.

The upper ends of the tubes may also be bent as indicated at 21 and entered into one side of the limbs of the upper header so that an adjacent side of said header as at 22 can be brought close to the transparent panel 5 and the parallel main bodies of the tubes be brought close to the inner surface of said transparent panel. The insulating backing 1 may be provided with a channel 23 to receive a bent sheet 24 in the bend of which, the upper header 11 is seated thus allowing said header to be subject to caloric rays passing through the panel.

The connections 13, 14 are in the form of pipes connected with a domestic tank or reservoir 25 from which a service pipe 26 leads for connection with the water faucets 27 of the house.

The heater proper is shown installed aslant on the sloping side of the roof 28 but it is understood that it may be otherwise installed.

The grooves formed in the reflecting sheet may be either V-shaped grooves as shown in Fig. 5, or U-shaped grooves as shown in Fig. 6 and the bodies of said tubes are brought close to the tops of the grooves but are not in contact with the walls thereof so that they are air insulated from the reflectors but receive radiant heat therefrom.

In practical operation the contracted ends of the tubes cause the fluid to be held back within the tubes so that when a faucet 27 is opened the flow will be distributed through all the tubes. The heat expanded peripheral skin of water in the tubes tends to rise to the upper ends of the tubes and collects in the bent limbs 21 thereof that are bent so that the orifices 19 are practically lateral draw off outlets to which the hot water of the tubes will be supplied while the colder water at the axes of the tubes may settle to the lower sides of the tubes to receive the reflected heat, and large capacity for heating liquid is secured by providing a large number of these thin tubes. The numerous tubes can be readily installed because of the small diameter in which I make the tubes; it being a very easy matter and comparatively inexpensive to construct a heater with numerous tubes of ¼ inch diameter inserted into two one-inch headers and since the contracted passage at 19 which controls the flow is of a still smaller diameter than the tube, the amount of liquid delivered from the tubes respectively will be equalized and the likelihood of short-circuiting when a service cock 27 is open, is thereby minimized.

To construct the heater the tubes 20 may be screwed or otherwise inserted and fixed into the headers 10, 11 while the tubes are straight, and then the bends 21, 29 may be made by heating the tubes close to the headers sufficiently to allow the metal to be bent without opening the joints.

When sediment is deposited in the lower header 10 the same may be blown out by opening the blow-out cock 15.

The thin heat conducting tubes 20 are proportionally spaced apart so that the inter-tube spaces are about equal in width to the diameters of the tubes, and said tubes are located as close to the transparent panel 5 as is practical without actual contact between the plate and the tubes; and the outer edges of the reflecting surfaces 8 practically contact with the transparent panel 5 and with the insulating backing 1; but are spaced apart slightly from the tubes; the whole construction thus being made compact and the tubes being isolated in separate chambers formed by the respective grooves and the sheet 5, and air insulated to prevent the escape of heat by conduction through the reflectors or the panel 5 when the external air is comparatively cold, or when the caloric rays are not active to heat the liquid.

The panel 5 that is transparent to the heat rays is arranged as shown extending over and closing the grooves 9; and the insulating backing and walls are connected with said panel for inclosing said tubes and the reflector, so that each of the tubes is isolated within a chamber having reflecting walls and a transparent face, and the reflector and tubes are inclosed within a common chamber constructed to retain the heat. Each tube is therefore confined by itself to conserve the heat rays it receives irrespective of the other tubes.

The copper sheet that is corrugated to receive the tubes is bent along its edges to form wings 29 to fit in recesses 6 under the edges of the transparent panel which may be secured by putty 30 that extends over the wings 29 on the shoulders formed by the recesses 6 in the side walls 3.

The contracted orifices 19 for the tubes are readily formed by the swaging that results from the process of cutting the copper tubes which are sufficiently ductile to be spun in at the ends by the same pipe-cutting tool that is used for cutting the tube.

The tubes are at right angles to the lower or supply header 10 from which the cold water is supplied to the tubes under pressure and the water thus readily flows directly through the tubes but as the water issues from the contracted portions 19 of the tubes in a heated condition it enters the oblique header and changes its direction gradually to flow to the outlet 13 thus avoiding friction that might tend to short-circuit the flow.

An oblique reflector 32 is provided above and extending along the upper header behind the transparent panel 5 so that said upper header is not only heated by the direct rays passing through the panel 5, but also by rays reflected from the reflector 32.

It is understood that the reflectors may be made of mirrors of any material but the most convenient and simple construction is secured by making the reflectors of the bright metal sheets as at 8 and 32.

By making the reflector of a single corrugated sheet of bright metal it is simply necessary to crimp or corrugate the sheet and apply it in the chamber 7 prepared therefor, and then to place the tubular structure comprising the headers 10, 11 and the tubes 20 in desired position, and then lay the transparent pane of glass 5 in place and secure with putty 30. It is thus seen that I have made very cheap and simple provision for applying to the contents of the tubes a maximum amount of caloric from the sun's rays.

By making the reflectors of corrugated sheet metal, the corrugations of which accommodate the tubes respectively with but small or slight clearance, it is a simple and inexpensive matter to construct the heater in a light, compact and effective form, the corrugations making excellent reflectors as well as forming the side walls for the chambers in which the thin tubes extend, said chambers and walls being made by corrugations of such a character that the sheet from side to side need not be in thickness, twice the diameter of the tubes they contain and all of the reflectors are formed by a single sheet that is easily placed in position in the insulating box ready to receive the tubes and the transparent sheet.

I claim:

1. A heater for heating fluid by means of caloric rays which comprises a header connected to receive a fluid; a header connected to discharge the fluid; thin connecting tubes connecting the headers together; a corrugated sheet forming a grooved reflector; the thin tubes extending along within the grooves respectively, and the grooves being of a width and depth to accommodate the contained tubes with only a small clearance; the tubes being arranged out of contact with the reflector; a panel transparent to the heat rays extending over and closing the grooves; and insulating backing and walls connected with said panel for inclosing said tubes and reflector.

2. A heater for heating fluid by means of caloric rays which comprises a header connected to receive a fluid; a header connected to discharge the fluid; thin connecting tubes connecting the headers together; a corrugated sheet forming a grooved reflector; the thin tubes extending along within the grooves respectively, and the grooves being of a width and depth to accommodate the contained tubes with only a small clearance; the tubes being arranged out of contact with the reflector; a sheet transparent to the heat rays extending over the grooves and contacting with said reflector and isolating said tubes.

3. A heater for heating fluids from caloric rays comprising an insulating frame having a chamber and a sheet forming one side of said chamber; headers at opposite ends of said chamber, said headers being connected to receive and discharge fluid; thin tubes connecting said headers; and a grooved reflector formed of a corrugated metal sheet in said chamber; said thin tubes extending along within the grooves with a small clearance between them and the walls of the grooves, and being inclosed between the headers, the reflector and the transparent panel, and thereby isolated to prevent loss of heat from the tubes respectively.

4. In a heater, headers having connections to receive and discharge fluid and thin tubes connecting said headers, said thin tubes being swaged and contracted at one end to form contracted outlets for said tubes, and means to direct the sun's rays onto said tubes and the header.

5. In a heater, headers having connections to receive and discharge fluid; and thin tubes connecting said headers; said thin tubes being swaged and contracted at one end to form contracted outlets for said tubes; said tubes being bent at the upper ends to allow the ends of the tubes to enter one side of the header, and the outlets being below the level of the top of the tubes, and means to direct the sun's rays onto said tubes and the header.

6. In a heater, a header; tubes connected to said heater and extending at right angles therefrom; and another header having a portion arranged obliquely to said tubes and connected to the tubes and to connections for the discharge of fluid, and means to direct the sun's rays onto said tubes and the header.

7. In a heater, the combination of two headers; and tubes connecting said headers; one of said headers having a central outlet and oblique limbs leading to said outlet, and means to direct the sun's rays onto said tubes and the header.

8. In a heater, lower and upper headers; thin tubes arranged aslant connecting said headers; a slanting grooved reflector; the thin tubes being accommodated in and extending along said grooves respectively, there being a small clearance between the tubes and the walls of the grooves, a transparent sheet over the tubes and upper header; and a reflector aslant behind said sheet and extending along the upper header.

In testimony whereof, I have hereunto set my hand at Los Angeles, California, this 19th day of July, 1915.

DAVID A. HARRISON.

In presence of—
JAMES R. TOWNSEND.